Figure 1:
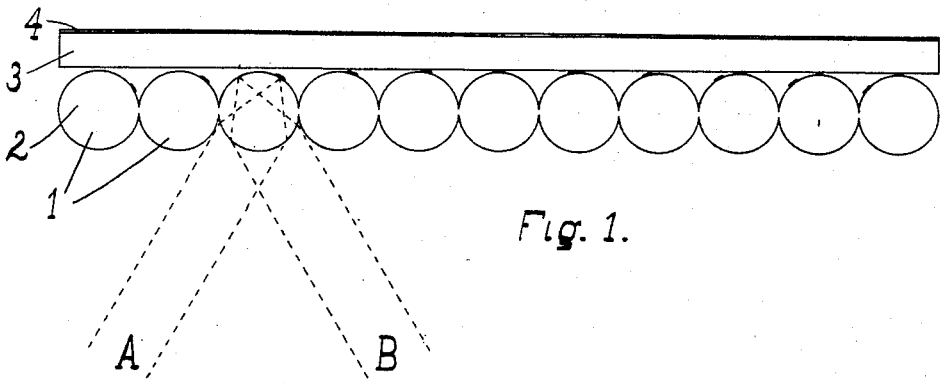

C. W. KANOLT.
CHANGEABLE PICTURE AND METHOD OF MAKING THE SAME.
APPLICATION FILED APR. 4, 1912. RENEWED JAN. 16, 1915.

1,150,374.

Patented Aug. 17, 1915.
3 SHEETS—SHEET 1.

C. W. KANOLT.
CHANGEABLE PICTURE AND METHOD OF MAKING THE SAME.
APPLICATION FILED APR. 4, 1912. RENEWED JAN. 16, 1915.

1,150,374.

Patented Aug. 17, 1915.
3 SHEETS—SHEET 2.

WITNESSES

INVENTOR
Clarence W. Kanolt
By Robertson & Johnson
Attorneys

C. W. KANOLT.
CHANGEABLE PICTURE AND METHOD OF MAKING THE SAME.
APPLICATION FILED APR. 4, 1912. RENEWED JAN. 16, 1915.

1,150,374.

Patented Aug. 17, 1915.
3 SHEETS—SHEET 3.

UNITED STATES PATENT OFFICE.

CLARENCE W. KANOLT, OF WASHINGTON, DISTRICT OF COLUMBIA.

CHANGEABLE PICTURE AND METHOD OF MAKING THE SAME.

1,150,374.   Specification of Letters Patent.   Patented Aug. 17, 1915.

Application filed April 4, 1912, Serial No. 688,494. Renewed January 16, 1915. Serial No. 2,720.

*To all whom it may concern:*

Be it known that I, CLARENCE W. KANOLT, a citizen of the United States of America, and a resident of Washington, in the District of Columbia, have invented certain new and useful Improvements in Changeable Pictures and Methods of Making the Same, of which the following is a specification.

My invention relates to changeable picture and to the method of making the same and has as its object the production of a picture of this character in which the effect of change or movement is produced by optical means on a change in the relative position of the observer the said means and the picture.

While two or more entirely different representations may be successively exhibited by one of my pictures, the invention is more characteristically embodied in a picture in which there is either a representation of a single object so located as to give the appearance of movement or a series of representations comprising a basic representation and variants thereof so located as to give the appearance of continuous change from one into the other. Briefly speaking, the mode in which these results are accomplished includes the provision of means for determining and controlling the areas of said picture on which the light shall fall, which in the preferred embodiment of my invention herein illustrated comprises a number of light deflecting and magnifying means such as lenses located in front of the representation which is to be the basis of the picture, and dividing the representation and the ground on which it is located into a corresponding number of fields of vision, parts only of which are visible from certain points of view by reason of the optical law of the lenses employed. The location of sets of component parts of the representations in a given case each only on the lines of vision from a given point of view will obviously result in exhibiting to the observer a series of different representations as the relative position of the observer, the interposed means and the picture changes. These sets may be arranged so that there is a gradual change from one into the other as the line of vision sweeps across each of the fields of vision.

The invention will more clearly and fully appear and other of its features will be pointed out hereinafter.

Figure 2:
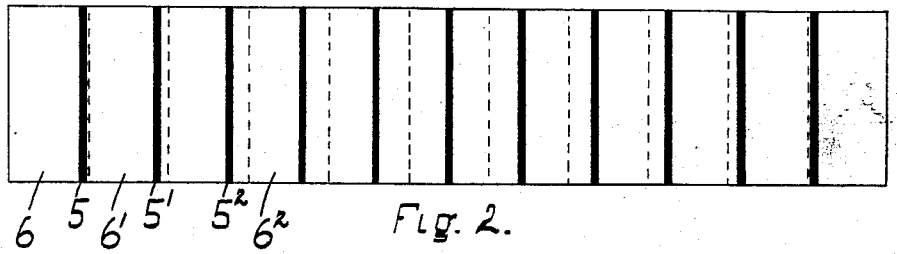
Figure 3:
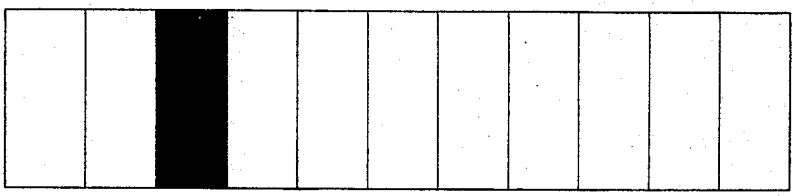
Figure 4:
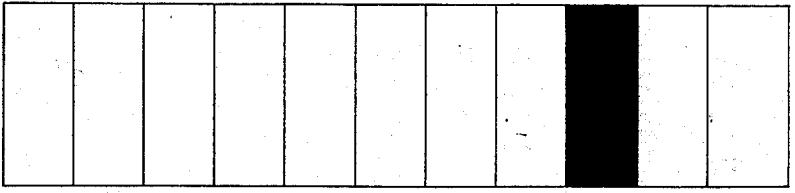
Figure 5:
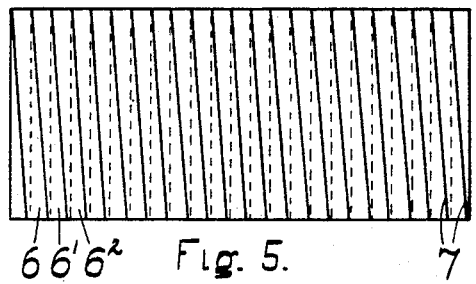
Figure 6:
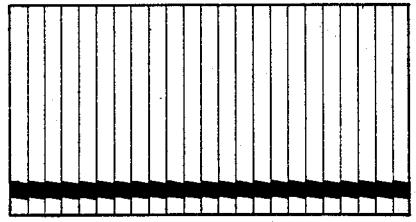
Figure 7:
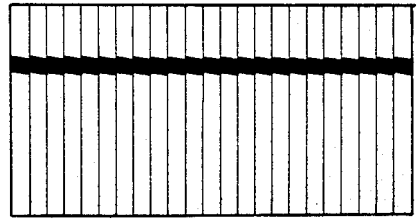
Figure 8:
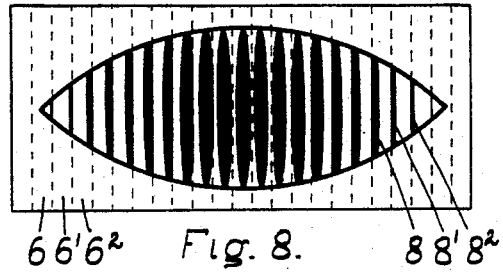
Figure 9:
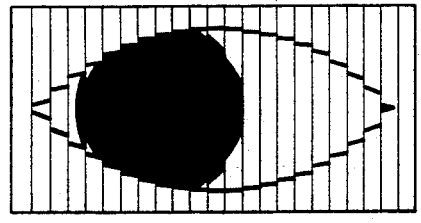
Figure 10:
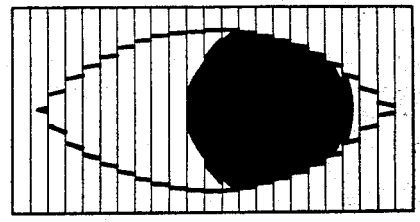
Figure 13:
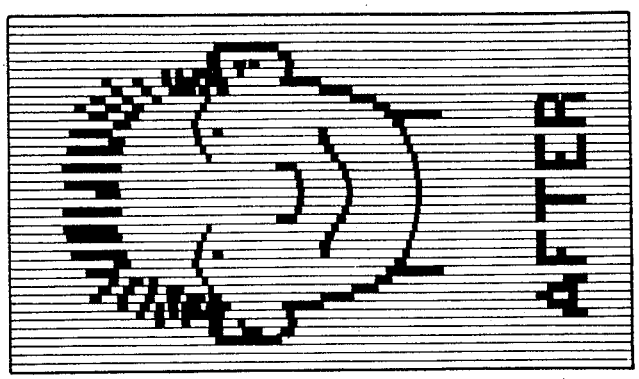
Figure 12:
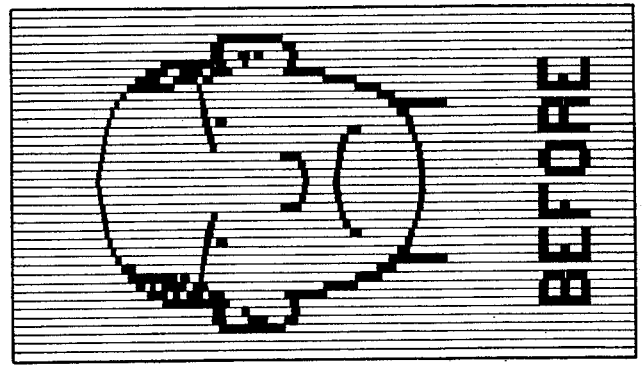
Figure 11:
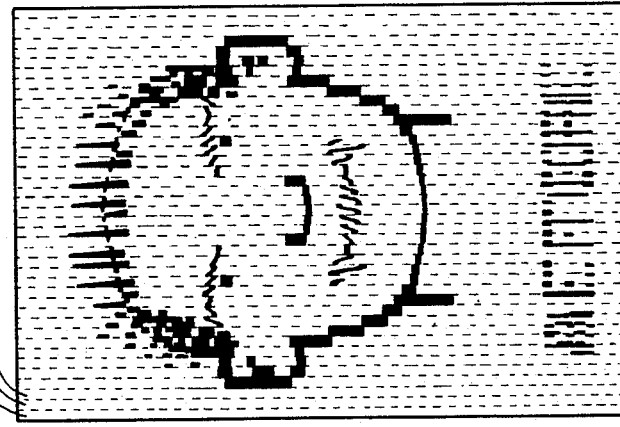

Referring to the drawings: Figure 1 is a diagrammatic view showing a screen of lenses, the relative location of the component parts of the representation thereon and the manner in which the light would be refracted from different points of view. Fig. 2 is a representation corresponding to Fig. 1 and showing the ground divided into fields of vision and the location in different relative positions thereon of the component parts, making up the representation of a vertical line. Fig. 3 shows the representation of Fig. 2 as seen by an observer at the left of the picture. Fig. 4 shows the same representation as seen by an observer from the right hand of the picture. Fig. 5 shows the ground divided into fields of vision and the location in different relative positions thereon of the component parts of the representation of a horizontal line. Fig. 6 shows the representation of Fig. 5 as seen by an observer at the left of the picture. Fig. 7 shows the same representation as seen by an observer at the right of the picture. Fig. 8 shows the ground divided into fields of vision in which are located the component parts of the representation of an eye. Fig. 9 shows the representation of Fig. 8 as seen by an observer at the left of the picture. Fig. 10 shows the same representation as seen by an observer at the right of the picture. Fig. 11 shows the ground divided into fields of vision and the location thereon of the component parts of a representation and of variants thereof. Fig. 12 illustrates the representation of Fig. 11 as seen by an observer at the left of the picture, and Fig. 13 shows the same representation as seen by an observer at the right of the picture.

The screen which determines and controls the areas of the picture on which the light shall fall for any given relative position of the picture, screen and observer, is in the embodiment illustrated, made up of light deflecting and magnifying means. In the said preferred embodiment the lenses which serve to exhibit from any given point of view the representation which it is desired shall be seen from that point are of such shape, character and configuration as may be desired. The magnification may be lateral as when vertical, cylindrical lenses are used—or vertical as where horizontal, cylindrical lenses are used—or it may be otherwise according to the law of the lens or lenses employed. I prefer to employ cylindrical lenses 1 located in parallelism in a vertical plane. These lenses may be separate rods located side by side or they may be in the nature of corrugations on a sheet 2 of transparent or translucent material as celluloid. It is not necessary that they should be double, i. e., complete cylinders, since if they are rods, the back may be plane, or in the case of a screen, the back thereof might be plane. The grooves between the corrugations should be sufficiently deep to prevent any danger of false images. Whether the rods are separate or are in the nature of a unitary plate, they form a screen which exhibits parts of the representation while it hides other parts, the parts visible and the parts hidden varying according to the point of view.

In describing and illustrating the invention I have considered an observer whose position with respect to the picture changes but it will be obvious that the same results would be secured if the position of the picture changed while that of the observer remained the same.

Change in the relative position of the picture, screen and observer displays the picture.

As shown in Fig. 1, I prefer to locate the representation directly on the back of the lenses or transparent or translucent screen which thus constitutes the ground. I may, however, produce the representation on a ground separate from the lenses. In either case, however, the representation is behind the lenses. In order to avoid undesirable shadows, I prefer to place a transparent or translucent plate 3 back of the said screen where the representation is located on it, and to employ an opaque backing plate 4, although this is not necessary.

The principles in accordance with which the picture is produced are clearly illustrated in Figs. 1-7 to which reference should be made. As already stated, the ground on which the representation is placed is divided into a number of distinct fields of vision corresponding to the various lenses 1. Each of these fields can be observed only through its own lens and from any given point of view only a portion of each field of vision can be observed. In the case illustrated in the figures referred to this portion is a vertical line which moves gradually across the field of vision as the position of the observer changes. Figs. 1-4 represent the simple case of a vertical line whose component parts 5, 5′, 5² etc. are illustrated in Figs. 1 and 2 as located in different parts of the fields of vision 6, 6′, 6², etc. An observer viewing the picture from the point of view A at the left of the picture would see only that part of the fields of vision lying in vertical lines of vision displaced to the right of the center line of such fields. As there is nothing in these lines of vision on the lenses to the right in Fig. 1 and as, on the contary, there is a representation in these lines of vision at the left of Fig. 1, the line would appear at the point indicated in Fig. 3 and magnified by the lenses as therein shown. In a similar way if the observer were located at B, the lines of vision visible to him at the left hand of Fig. 1 would not contain any representation, whereas those at the right of the said figure would and thus the line would appear magnified in the position shown in Fig. 4. It is obvious that as the observer changed his position from A to B, the line would appear to travel from the position shown in Fig. 3 to that shown in Fig. 4. It is thus apparent that the appearance of motion in a horizontal direction can readily be obtained.

Vertical motion can be obtained in the manner shown in Figs. 5–7 in which the ground, as before, is divided into fields of vision 6, 6′, 6², etc. In each of these fields of vision is a diagonal line 7 which contains the component parts making up a horizontal line when viewed through the lenses or screen. If the observer looks from the left of the picture the various lines of vision through the lenses from that point will intersect the line 7 at a point near the bottom of the picture so that the points of intersection will be combined into a magnified horizontal line near the bottom of the picture as seen in Fig. 6. If, on the contrary, the position of the observer is at the right of the picture the various lines of vision which he can then see will intersect the diagonal lines nearer the top of the picture, the points of intersection being combined and magnified so as to present to him a horizontal line as indicated at the top of the picture in Fig. 7. It will thus be obvious than an observer passing the picture from left to right will see a horizontal line which gradually moves upward across the picture.

It will be apparent that motion in any direction may be produced by using the principles above mentioned or by combining the two and that effects of any desired complexity may be worked out, it being merely necessary to locate whatever representation is to be visible from a particular point of view solely on the portions of the fields of vision which are visible from that point of view, or in other words, on the lines of vision from that point and to locate other representations or variant representations where they will be seen from other desired points of view, each representation or variant being located on such parts of the various fields of vision as to be visible from the point of view or points of view desired. It will be evident that the representations may be so located that the change from one to the other will be gradual or they may be arranged so that there will be an abrupt change.

Typically different embodiments of the invention have already been suggested and two such embodiments showing a picture in which the effect of continuous motion is produced are illustrated and will now be described.

Figs. 8–10 illustrate the representation of an eye, Fig. 8 showing a ground having as before fields of vision 6, 6', 6², etc. on which are located component parts 8, 8', 8² etc. of the representation of an eye, these parts being located in such parts of the field of vision as to be visible from certain points of view while not being visible from others, this location being in accordance with principles above discussed. Certain parts of the eye should appear the same from all points of view and accordingly the component parts which it is desired shall be thus seen are so located on the fields of vision as to be seen from all points of view. An observer standing at the left of the picture would see those component parts of the representation lying near the right of the various fields of vision and as, except for the outline of the eye, there is nothing in those portions of the field of vision in the right half of the ground as shown in Fig. 8 and as component parts do appear in said portions toward the left of the said ground, the observer would see the eye as shown in Fig. 9, whereas if he viewed the picture from the right, conditions would be reversed and he would see the eye as indicated in Fig. 10. As he passes from one position to the other the eye would seem to move and follow him. The broken effect of the lines in these and other figures is exaggerated and would not in practice be noticed.

Another typical embodiment of the invention is illustrated in Figs. 11–13. In accordance with the principles heretofore referred to it is possible to obtain the effect of continuous movement or change from one position to another and even to produce the appearance of growth. This might be plant growth or animal growth, the figures in question illustrating a change in facial expression and the growth of hair. These figures are adapted for use as a sign for a cure for baldness, the first picture showing the prospective customer bald and with a glum expression and the second showing him with a complete head of hair and with a very cheerful aspect, the words "Before" and "After" occurring on the respective views. Not only is it possible to secure this result but to make the change from one to the other take place gradually so that the face is seen gradually to smile and the hair to start up and grow. It would be possible to add other features such as the gradual growth of a beard or other changes by similar methods.

As before, the ground is divided into fields of vision 6, 6', 6², etc., it not being necessary to actually indicate these fields by dotted lines or otherwise as is done in Fig. 11 but said fields existing and being distinct. It will be seen that Fig. 11 shows a composite representation or representations which are in the nature of the representation shown in Fig. 12 and variants thereof, the component parts of the words "Before" and "After" being also both located in the various fields of vision so as to be visible from the respective points of view desired. Considering the composite mouth shown in Fig. 11, it will be clear that if the observer looks at the picture from a point of view somewhat to the left thereof or will see through the lenses those parts of the mouth which are near the right hand limits of the fields of vision. On comparison of Figs. 11 and 12, it will be seen that the points which are visible from this position will be combined as shown in Fig. 12, the other parts not being visible. Similarly the eye-brows will be shown slanting downward from the outside to assist in giving a gloomy expression. No hair will appear from this point of view since the hair is all located in parts of the fields of vision not visible from the view point mentioned. This also will be evident on careful consideration of Fig. 11. As the position of the observer changes, however, he will see different parts of the fields of vision, the lines of vision moving gradually to the left as he moves to the right, the result being that in each position the view he sees will be somewhat different and the effect will be a gradual change from the gloomy expression and hairless condition of Fig. 12 to the cheerful aspect and the full head of hair shown in Fig. 13 which is the view obtained by the observer from a point in front of the picture and somewhat to the right thereof. If Fig. 11 is looked at closely, it will be noted that the hairs are at and near the left limit of each of the fields of vision in which they occur and will therefore be seen from the point of view last named. An eye which would appear to change its position and even an eye-lid which would wink might be added but these have been omitted from the drawings since they would so complicate the illustration as to obscure the principle. The hair could have been so represented as to have made the appearance thereof in Fig. 13 perfectly solid, but this seems less realistic than the showing selected. Should the observer pass the picture in reverse direction the opposite result would be produced and the hair would grow back and disappear and the smile change to a sour expression. This reversal of the operation may be avoided by moving the picture instead of relying on the movement of the observer passing it. It would obviously be possible to locate the picture on an endless band or screen. As explained earlier in the specification in connection with Figs. 1-10 with lenses of the sort illustrated horizontal movement may be obtained by moving the components of the representation in a horizontal direction and vertical movement may be secured by changing their position vertically. Obviously, if the change from one position to another is to appear gradual the components must be located so that there will be no intermediate point at which they are not visible. They thus make up continuous lines as illustrated for instance in the eye-brows or mouth shown in Fig. 11. In this connection it may be noted that the steeper the slant of a line in a field of vision the more sudden will be the transition, the movement being upward or downward as stated heretofore.

The method of making a changeable picture in accordance with my invention will probably be apparent from what has already been said. However, I may add that I find the points, on the ground on which the representation is to be placed, which would be seen through the light deflecting and magnifying means, which are to be employed, from each of several different points of view, and locate on each such set of points only, the parts of the representation which it is desired shall be seen from the corresponding point of view. If it is desired that the effect of continuous motion should be given I connect the component parts of the different sets so as to secure that result in accordance with the principle stated. It will be apparent that the representation seen from any one point of view may be in part the same as that shown from another point of view by showing such parts of the picture on the parts of the fields of vision visible from both said points of view. On the contrary, it is equally clear that parts visible from one point of view may be omitted or parts added for a different point of view.

Where the movements to be represented are specially complicated, as in the case of the moving parts of machines, etc., the points may be located by the aid of mathematics. The following is the general mathematical method of finding the equations of the curves to be produced upon the backs of the lenses to exhibit a given desired apparent motion. In special cases shorter methods might be found, and in many— probably most cases—it would not be necessary to use mathematics except perhaps in an elementary form.

A moving picture may be considered as made up of one or more moving lines or points. The problem of a moving point is similar to that of a moving line, but simpler; consequently only the latter will be considered. A moving line in the picture may in general be represented by an equation of the form, $$y = f(x, \theta) \quad \text{Equation I}$$

where $x$ and $y$ are respectively the horizontal and vertical coördinates of a point on the curve which is to be seen in the picture, $x$ and $y$ being measured respectively from any vertical and horizontal axes that may be chosen. $\theta$ is the angle from which the picture is viewed, measured from any arbitrary zero position, and, $f(x, \theta)$ represents some function of $x$ and $\theta$. This equation may, in general be found by well-known mathematical methods.

Suppose the picture to be made with straight vertical lenses, as would usually be the case, and let $x_{\prime}$, be the horizontal coördinate of the particular lens to be considered, i. e. the value of $x$ for this lens, considering that the width of the lens is very small relative to the width of the picture, and that therefore the difference between the values of $x$ for different parts of the lens may be neglected. Substituting this value of $x$ in Equation I, we obtain an equation of the form, $$y = f(x_{\prime}, \theta) \quad \text{Equation II.}$$

Let $u$ represent the horizontal coördinate, measured from any arbitrary vertical axis, of a point on the curve to be drawn on the back of the particular lens under consideration. $y$ will be its vertical coördinate. The equation, $$u = u_0 + a\theta \quad \text{Equation III}$$

where $u_0$ and $a$ are constants which may be evaluated, expresses the fact that the change in the position of the part of the back of the lens visible to the observer is proportionate to the change in the angle of observation. $u_0$ corresponds to the part of the back of the lens seen from a position for which $\theta = 0$. $a$ is proportionate to the rate at which $u$ changes with change of $\theta$; thus, if a range of 0.1 inch upon the back of the lens is to be swept over in a change of angle of observation of 100°, then $a$ equals 0.001 inch per degree. By this Equation III it is posssible to eliminate $\theta$ from Equation II, thus obtaining an equation expressing $y$ in terms of $u$ and the constants, which is the equation desired.

Many special cases might thus be worked out such for instance as a rotating but bodily stationary wheel, a rolling wheel, etc. The latter will serve as a sufficient example and like the former involves tangent curves.

Suppose the picture is to represent a wheel rolling upon a horizontal surface, and it is required to find the equation of the curves to be drawn on the backs of the lenses to represent one of the moving spokes. It can be shown by well-known mathematical methods that the motion of such a spoke can be represented by the equation, $$y = r + (x - d - c\theta) \tan.\left(\beta - \frac{c\theta}{r}\right),$$

where $r$ represents the radius of the wheel, $d$ is a constant depending upon the position of the wheel in the picture, $c$ is a constant depending upon the apparent velocity of the wheel, and $\beta$ is a constant depending upon the angular position of the spoke in the wheel. If $x_{\prime}$ is substituted for $x$ and $\theta$ is eliminated by means of Equation III, the result is $$y = r + \left[x_{\prime} - d - \frac{c}{a}(u - u_0)\right] \tan.\left[\beta - \frac{c}{ar}(u - u_0)\right]$$

which is the required equation.

What I claim as my invention is:

1. A ground for a changeable picture designed to be viewed through light deflecting and magnifying means and made up of a number of distinct fields of vision and comprising a composite representation having several sets of component parts located in said fields of vision, the members of each said set being in the lines of vision through said light deflecting and magnifying means from a particular and different point of view.

2. A changeable picture comprising a series of lenses, and having distinct fields of vision corresponding thereto, and a composite representation back of said lenses having one set of component parts whose members are located in the portions of said fields of vision in the lines of vision through said lenses from a particular point of view, and another set of component parts whose members are located in the portions of said fields of vision in the lines of vision through said lenses from a different and widely separated point of view.

3. A changeable picture comprising a transparent or translucent deflecting and magnifying screen and a representation behind said screen and having one set of component parts whose members are located in the lines of vision through said screen from a particular point of view and some of which are separated, and having another set of component parts whose members are located in the lines of vision through said screen from a different point of view and some of which are separated, said screen acting to combine and display one of said sets of component parts while hiding the other and vice versa.

4. A changeable picture comprising a transparent or translucent screen provided with a number of lenses and having fields of vision corresponding to said lenses, and representations behind said screen having several sets of component parts located in respectively different parts of said fields of vision and visible or hidden in accordance with the law of the lenses and according to the relative position of the picture, observer, and screen.

5. A changeable picture comprising a number of adjacent lenses forming a transparent or translucent screen, and a representation behind said screen and having its component parts arranged in several sets each located in the lines of vision from a different point of view through said lenses.

6. A picture designed to simulate the appearance of continuous motion comprising a representation and a transparent or translucent screen in front of said representation provided with a number of distinct deflecting and magnifying means and dividing the representation into a plurality of distinct fields of vision corresponding to said means and across which the line of vision gradually shifts as the change between the relative position of the observer, picture and screen is effected, some of the component parts of said representation being located in the lines of vision from a particular point of view, others in the lines of vision from a widely different point of view, and some of the component parts of said representation extending continuously over several lines of vision.

7. A picture designed to simulate the appearance of continuous motion comprising a composite representation including a basic representation and a plurality of variants thereof, a transparent or translucent screen in front of said representation and having parallel corrugations forming lenses and dividing the representation into a plurality of distinct fields of vision corresponding to said lenses and across which the line of vision gradually shifts as the change between the relative position of the observer, picture and screen is effected, the component parts of said basic representation being located in the lines of vision from a particular point of view, and the component parts of successive individual varients thereof being located in the lines of vision from successive points of view separated from said first point of view and from each other, some of said component parts extending continuously over the lines of vision from a plurality of said points.

8. A changeable picture comprising a representation having several sets of component parts and a transparent or translucent screen in front of said representation provided with lenses and dividing the representation into a plurality of distinct adjacent fields of vision corresponding to said lenses on which said sets of component parts are located and across which the line of vision gradually shifts as the relative position of the observer, screen and picture changes.

9. A changeable picture comprising a transparent or translucent screen provided with parallel cylindrical lenses, a composite representation at the back of said screen, parts of which due to their location and the laws of the lenses are visible through said screen from a given point of view and are combined by said screen while other parts invisible from the said point for like reasons are visible from a point widely separated therefrom and at which some or all of the parts visible from the first point are invisible.

10. A changeable picture comprising a transparent or translucent screen provided with parallel cylindrical lenses, a composite representation at the back of said screen, and a transparent or translucent plate back of said screen and representation.

11. The method of making a changeable picture to be viewed through a plurality of lenses comprising the following steps, dividing the ground on which the picture is to be placed into a number of fields of vision each corresponding to one of the lenses through which it is to be viewed, locating component parts of said picture in said fields of vision some in the line of vision through the lenses from one point of view, and others in the lines of vision through said lenses from other points of view.

12. The method of making a changeable picture to be viewed through a number of light deflecting and magnifying means, consisting of finding the points which would be seen through said means from each of several different points of view and locating on each such set of points only, the component parts of a representation, or the component parts of a variant thereof.

13. A changeable picture comprising a transparent or translucent screen provided with parallel cylindrical lenses, a composite representation at the back of said screen and in such a position in the principal focus of the lens that most of the rays of light from any particular point of the representation, after passing through said screen, are sent out in approximately the same direction, the direction being different for other parts of the representation, parts of said representation being thus visible from a given point of view and being combined by said screen while other parts differently located at the back of the screen and invisible from the said point are visible from a point widely separated therefrom and at which some or all of the parts visible from the first point are invisible.

14. A picture designed to simulate the appearance of continuous motion comprising a composite representation including a basic representation and many successive variants thereof, a transparent or translucent screen in front of said representation and provided with a number of distinct light deflecting and magnifying means and dividing the representation into a plurality of distinct fields of vision corresponding to said means and across which the line of vision gradually shifts as the change between the relative position of the observer screen and picture is effected, said basic representation and the variants thereof having their component parts located in said fields of vision, said variants representing successive continuous change from the basic representation and said basic representation and said variants having their respective component parts in the like succession and in continuity in the various fields of vision.

15. A ground for a picture for simulating the appearance of continuous motion designed to be viewed through light deflecting and magnifying means and made up of a number of distinct fields of vision and comprising a basic representation and many successive variants thereof said basic representation and said respective variants being divided into separated component parts located in said fields of vision said variants representing successive continuous change from said basic representation and said basic representation and said variants having their respective component parts in the like succession and in continuity in the various fields of vision to simulate continuous motion when the relative position of the picture screen and observer changes.

16. A picture designed to simulate growth and which comprises a composite representation including a basic representation of a living thing and many successive variants thereof, a transparent or translucent screen in front of said representation and provided with a number of distinct light deflecting and magnifying means and dividing the representation into a plurality of distinct fields of vision corresponding to said means and across which the line of vision gradually shifts as the change between the relative position of the observer screen and picture is effected, said basic representation and the respective variants thereof having their component parts separated and located in different fields of vision, said variants representing continuous growth from the basic representation and said basic representation and said variants having their respective component parts in the like succession and in continuity in the various fields of vision.

17. A picture designed to simulate the appearance of continuous motion comprising a composite representation of an object which is moving or a part of which is moving consisting of a basic representation of said object and successive variants thereof showing continuous movement of said object or part, a screen in front of said picture successively revealing and concealing said representation and variants as change occurs in the relative position of said picture, screen and observer.

18. A picture designed to simulate the appearance of continuous motion comprising a composite representation including a basic representation and many successive variants thereof, a screen adjacent and in front of said composite representations for determining and controlling the areas of said picture on which the light shall fall, thus dividing the representation into a plurality of distinct fields of vision across which the line of vision gradually shifts as the change between the relative position of the observer, screen and picture is effected, said basic representation and the variants thereof having their component parts located in said fields of vision, said variants representing successive continuous change from the basic representation and said basic representation and said variants having their respective component parts in the like succession and in continuity in the various fields of vision.

19. A ground for a picture for simulating the appearance of continuous motion designed to be viewed through means for permitting the light to fall on restricted areas only for any given relative position of the picture, the said means and the observer, and made up of a number of distinct fields of vision and comprising a basic representation and many successive variants thereof said basic representation and said respective variants being divided into separated component parts located in said fields of vision said variants representing successive continuous change from said basic representation and said basic representation and said variants having their respective component parts in the like succession and in continuity in the various fields of vision to simulate continuous motion when the relative position of the picture, the said means and the observer changes.

In testimony whereof I affix my signature in presence of two witnesses.

CLARENCE W. KANOLT.

Witnesses:
JOHN L. FLETCHER,
MARGARET E. DILLER.

Copies of this patent may be obtained for five cents each, by addressing the "Commissioner of Patents, Washington, D. C."